United States Patent
Kawada et al.

(10) Patent No.: US 10,137,561 B2
(45) Date of Patent: Nov. 27, 2018

(54) ELECTRICAL CONNECTION BOX

(71) Applicant: Yazaki Corporation, Tokyo (JP)

(72) Inventors: Daisuke Kawada, Shizuoka (JP); Yuki Komiya, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 222 days.

(21) Appl. No.: 15/248,222

(22) Filed: Aug. 26, 2016

(65) Prior Publication Data

US 2017/0066113 A1 Mar. 9, 2017

(30) Foreign Application Priority Data

Sep. 3, 2015 (JP) ................................. 2015-173887

(51) Int. Cl.
| | | |
|---|---|---|
| *H01H 85/02* | (2006.01) | |
| *B25B 9/02* | (2006.01) | |
| *H02G 3/08* | (2006.01) | |
| *B60R 16/023* | (2006.01) | |

(52) U.S. Cl.
CPC ........... *B25B 9/02* (2013.01); *H01H 85/0208* (2013.01); *H02G 3/081* (2013.01); *B60R 16/0238* (2013.01)

(58) Field of Classification Search
CPC ...... H01H 85/00; H01H 85/02; H01H 85/208; B60R 11/06; G01R 31/07; G01R 31/327
USPC ...................... 174/520; 324/550; 228/110.1; 439/620.27; 81/3.8
See application file for complete search history.

(56) References Cited

U.S. PATENT DOCUMENTS

| | | | | |
|---|---|---|---|---|
| 4,852,747 A | * | 8/1989 | Breveglieri | A47L 13/512 211/60.1 |
| 5,666,865 A | * | 9/1997 | Ito | H01H 85/0208 29/278 |
| 6,047,515 A | * | 4/2000 | Behlen | E04C 5/20 248/231.9 |

(Continued)

FOREIGN PATENT DOCUMENTS

| | | |
|---|---|---|
| CN | 106206206 A | 12/2016 |
| JP | 03-055636 U1 | 5/1991 |

(Continued)

OTHER PUBLICATIONS

Chinese Office Action for the related Chinese Patent Application No. 201610791252.X dated Nov. 1, 2017.

(Continued)

*Primary Examiner* — Xiaoliang Chen
(74) *Attorney, Agent, or Firm* — Kenealy Vaidya LLP (57) ABSTRACT

An electrical connection box includes a housing, a tool and a tool holding portion. The tool includes a main body in which a holding hole is formed, and a pinching portion. The tool holding portion includes a holding main body, a rotation regulating portion and a protrusion protruding on an opposite side from a side of the rotation regulating portion with the holding main body interposed therebetween. The protrusion is formed to face an opposite side from a side of the pinching portion with the holding hole interposed therebetween in the main body in an insertion direction in the holding state, and comes into contact with the main body in a state in which the pinching portion is positioned in a pulling direction compared to a position of the main body from the holding state.

10 Claims, 9 Drawing Sheets

(56) References Cited

U.S. PATENT DOCUMENTS

| | | | |
|---|---|---|---|
| 7,384,086 B2* | 6/2008 | Lukaszynski | H01H 85/0208 29/278 |
| 8,063,646 B2* | 11/2011 | Cram | G01R 31/286 324/550 |
| 2008/0035590 A1* | 2/2008 | Huang | B25H 3/006 211/70.6 |
| 2009/0019971 A1* | 1/2009 | Obama | H01H 85/0208 81/3.8 |
| 2009/0088026 A1* | 4/2009 | Furuya | H01H 85/0208 439/620.27 |
| 2009/0277951 A1* | 11/2009 | Ebihara | B23K 20/10 228/110.1 |
| 2013/0033269 A1 | 2/2013 | He | |
| 2016/0347260 A1* | 12/2016 | Kurashina | B60R 11/06 |

FOREIGN PATENT DOCUMENTS

| | | | | |
|---|---|---|---|---|
| JP | 8-315715 A | 11/1996 | | |
| JP | 10-040801 A | 2/1998 | | |
| JP | 2000-184557 A | 6/2000 | | |
| JP | 3570007 B2 | 9/2004 | | |
| JP | 2016-225085 A | 12/2016 | | |
| JP | 2016225085 A | * 12/2016 | | H01H 85/02 |
| WO | 2011/133602 A2 | 10/2011 | | |

OTHER PUBLICATIONS

Japanese Office Action for the related Japanese Patent Application No. 2015-173887 dated Oct. 3, 2017.

* cited by examiner

ELECTRICAL CONNECTION BOX

CROSS-REFERENCE TO RELATED APPLICATION(S)

The present application claims priority to and incorporates by reference the entire contents of Japanese Patent Application No. 2015-173887 filed in Japan on Sep. 3, 2015.

BACKGROUND OF THE INVENTION

1. Field of the Invention

The present invention relates to an electrical connection box.

2. Description of the Related Art

A conventional electrical connection box applied to a wire harness which is installed in a vehicle or the like includes a tool for detaching an electronic component accommodated in a housing from the housing. For example, as indicated in Japanese Patent No. 3570007, a tool for pulling out a fuse accommodated in a housing is held in the housing.

Incidentally, a holding state in which a tool is held in a housing of an electrical connection box is maintained while a vehicle or the like is driven. Therefore, the tool is strongly held in the housing, and thus there may be difficulty in detaching the tool in the holding state from the housing. In addition, when the tool in the holding state is detached from a tool holding portion that holds the tool in the housing, the tool holding portion may be deformed, and thus there may be difficulty in detaching the tool in the holding state from the housing.

SUMMARY OF THE INVENTION

An object of the invention is to provide an electrical connection box that allows a tool in a holding state to be reliably detached from a housing.

In order to achieve the above mentioned object, an electrical connection box according to one aspect of the present invention includes a housing that accommodates an electronic component; a tool that detaches the electronic component from the housing; and a tool holding portion that is formed on a forming face of the housing and detachably holds the tool, wherein the tool includes a main body in which a holding hole is formed and a pinching portion that protrudes from the main body and pinches the electronic component, the tool holding portion includes a holding main body that is formed to protrude from the forming face and holds the main body by being inserted into the holding hole, a rotation regulating portion that protrudes from the forming face and is formed to be separated from the holding main body, and regulates rotation of the pinching portion in a holding state in which the tool is held by the tool holding portion, and a protrusion that is formed to protrude from the forming face on an opposite side from a side of the rotation regulating portion with the holding main body interposed therebetween, and the protrusion is formed to face an opposite side from a side of the pinching portion with the holding hole interposed therebetween in the main body in an insertion direction in the holding state, and comes into contact with the main body in a state in which the pinching portion is positioned in a pulling direction corresponding to an opposite direction of the insertion direction compared to a position of the main body from the holding state.

According to another aspect of the present invention, in the electrical connection box, it is preferable that the electrical connection box further includes a first connection portion formed to protrude from the forming face to connect the holding main body to the rotation regulating portion.

According to still another aspect of the present invention, in the electrical connection box, it is preferable that the electrical connection box further includes a second connection portion formed to protrude from the forming face to connect the holding main body to the protrusion.

According to still another aspect of the present invention, in the electrical connection box, it is preferable that the protrusion comes into contact with the main body in the holding state.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a description will be given of an embodiment of an electrical connection box according to the invention in detail based on drawings. It should be noted that the invention is not restricted by the embodiment. In addition, a component in the embodiment below includes a component that can be easily assumed by those skilled in the art or substantially the same component. Further, a component in the embodiment below may be variously omitted, replaced, and modified within the scope not departing from a subject matter of the invention.

Embodiment

Figure 1:
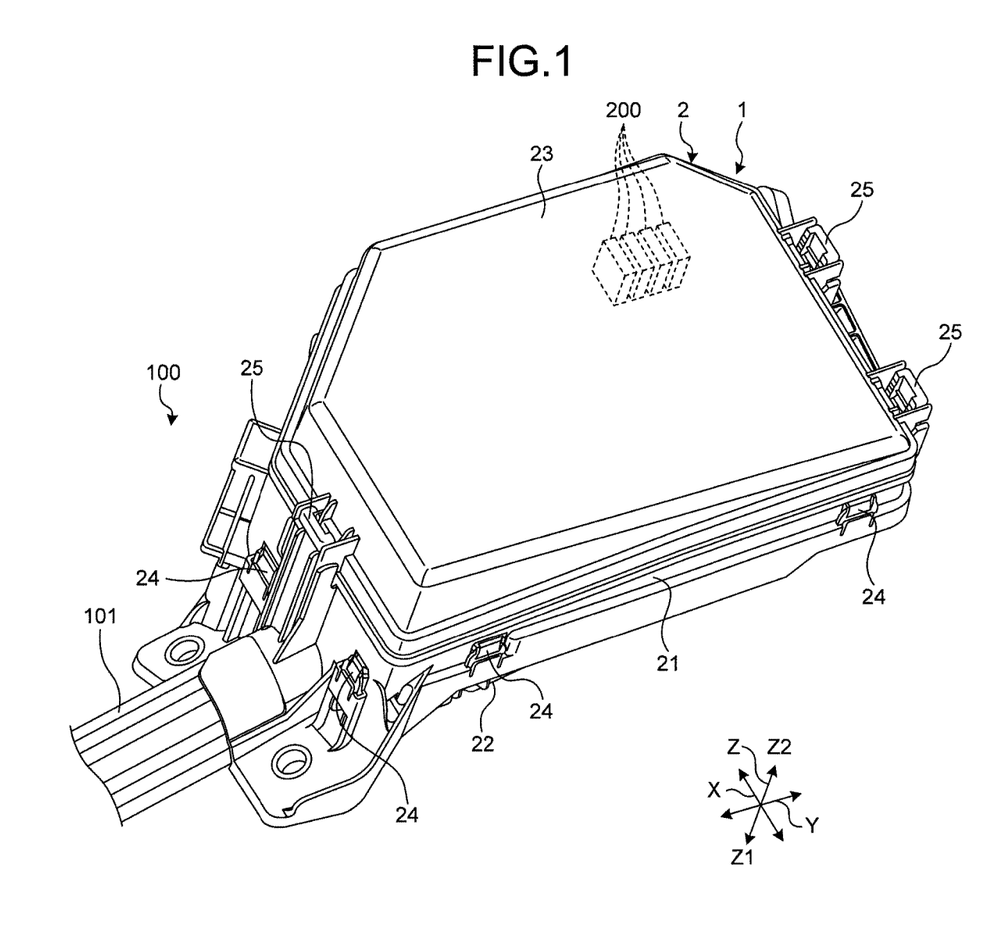
FIG. 1 is a perspective view illustrating an electrical connection box according to an embodiment.
Figure 2:
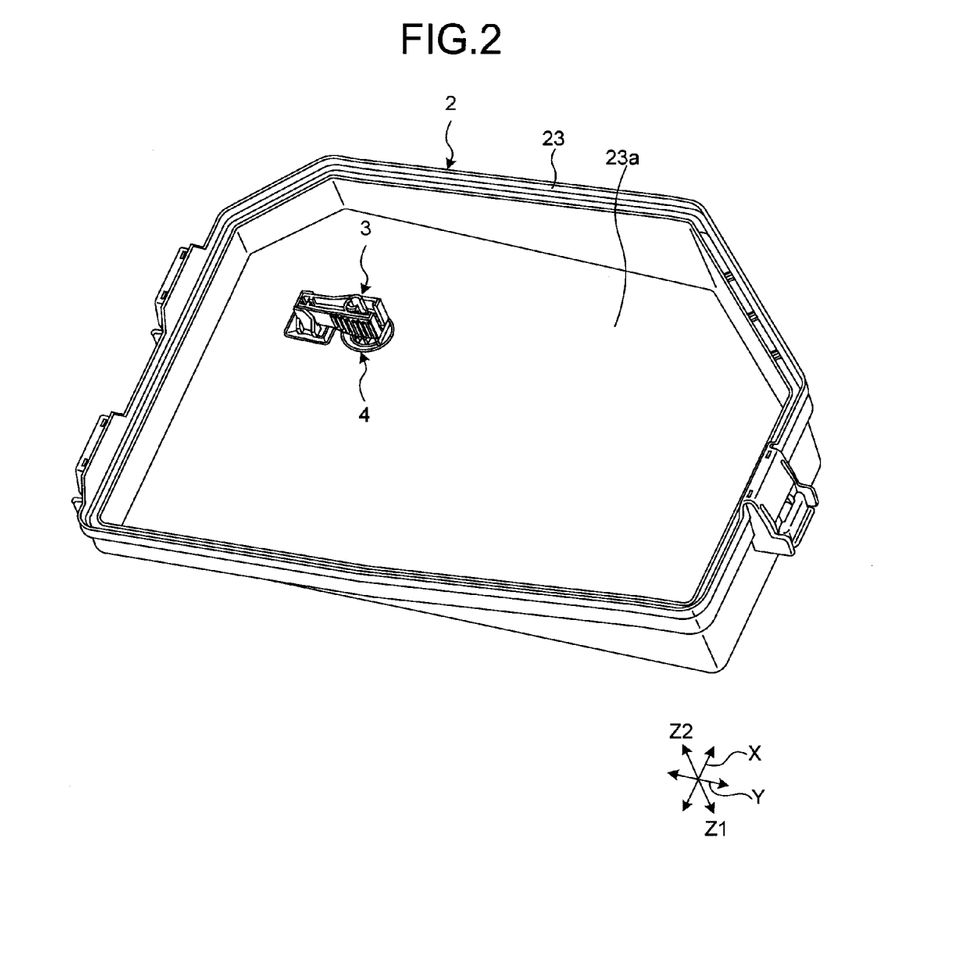
FIG. 2 is a perspective view of an upper cover of the electrical connection box according to the embodiment.
Figure 3:
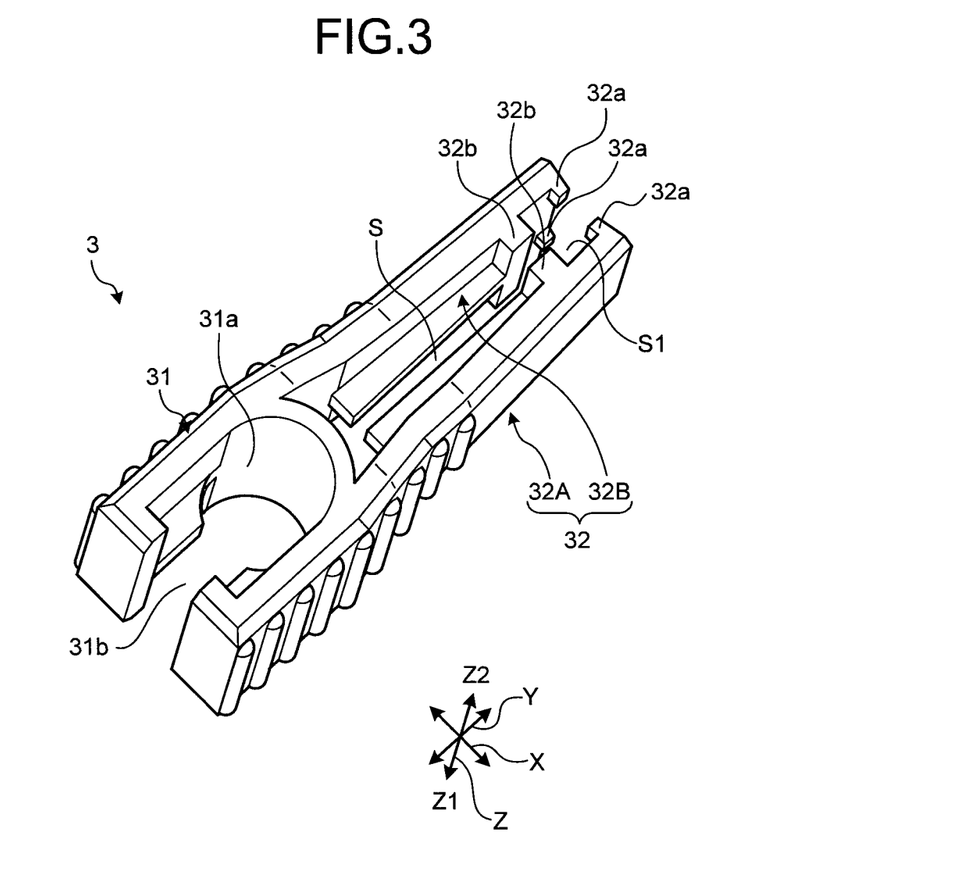
FIG. 3 is a perspective view illustrating a tool according to the embodiment.
Figure 4:
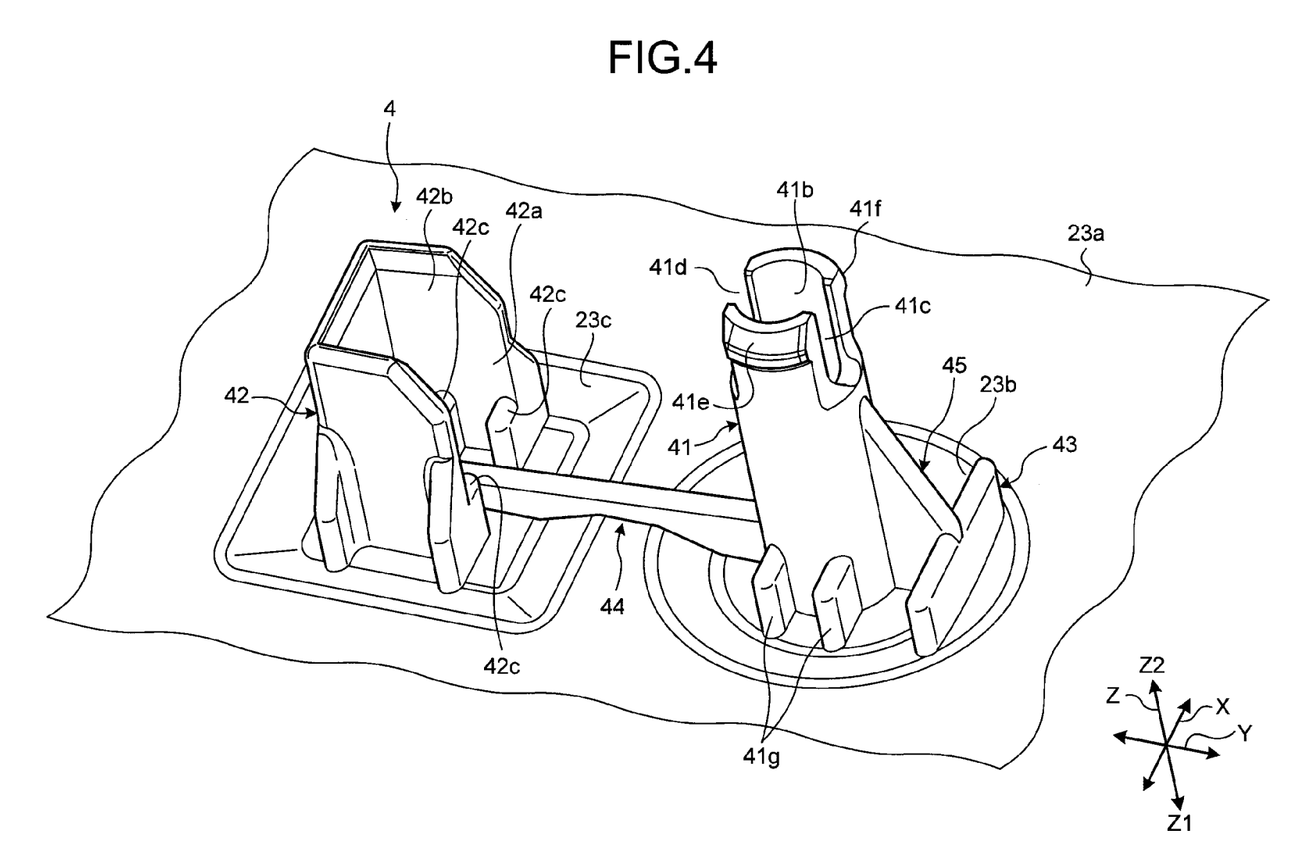
FIG. 4 is a perspective view illustrating a tool holding portion according to the embodiment.
Figure 5:
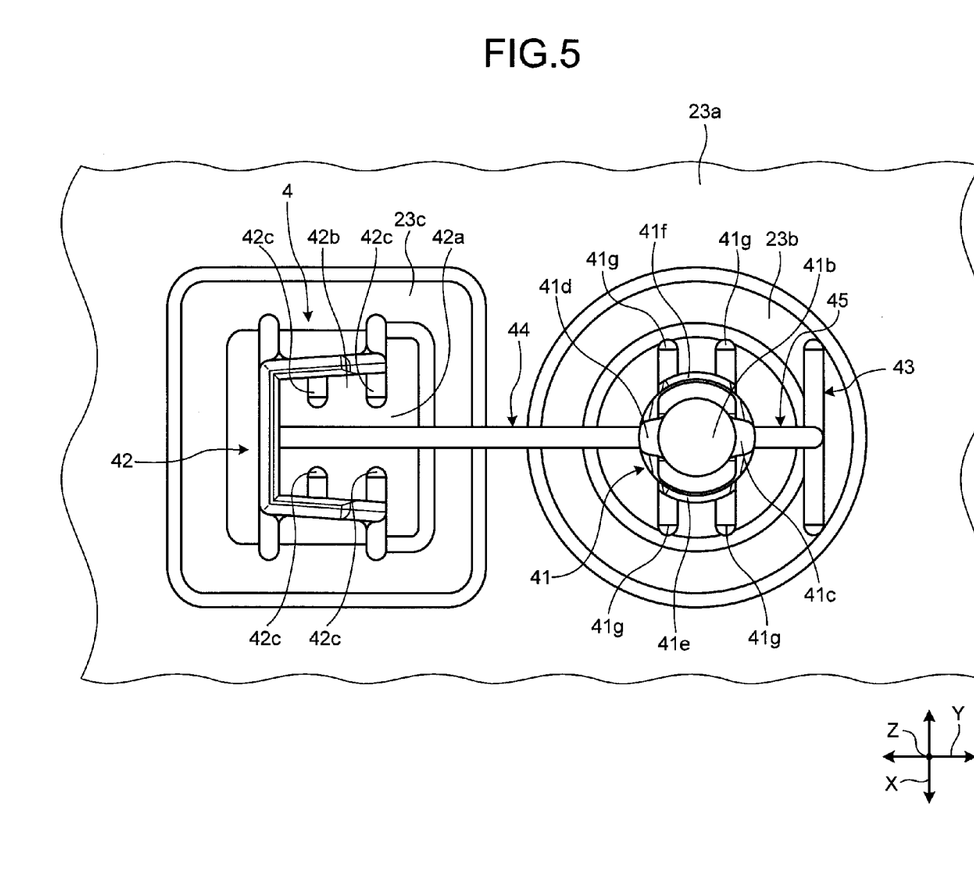
FIG. 5 is a plan view illustrating the tool holding portion according to the embodiment.
Figure 6:
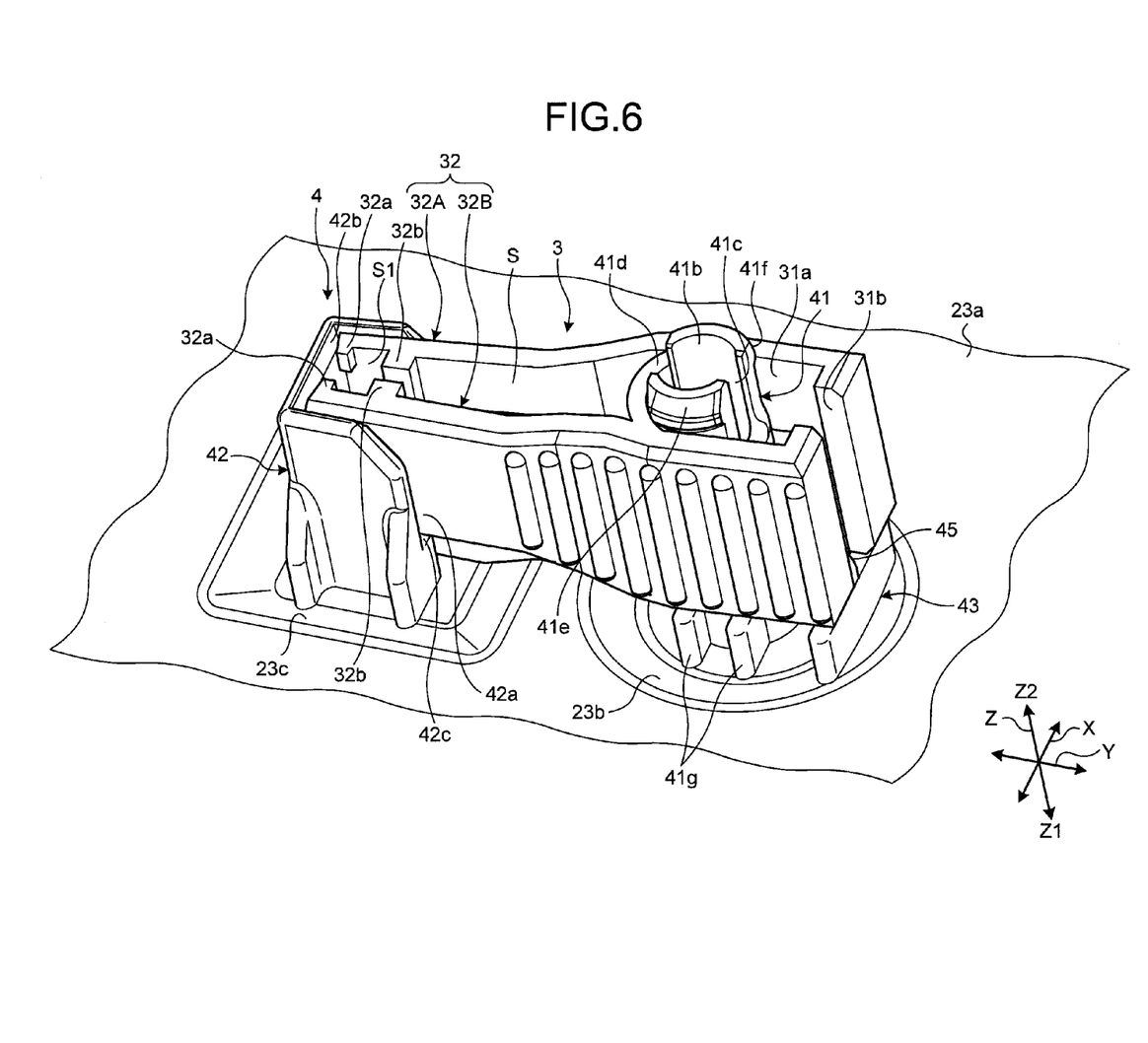
FIG. 6 is a perspective view illustrating a state in which the tool is held by the tool holding portion according to the embodiment.
Figure 7:
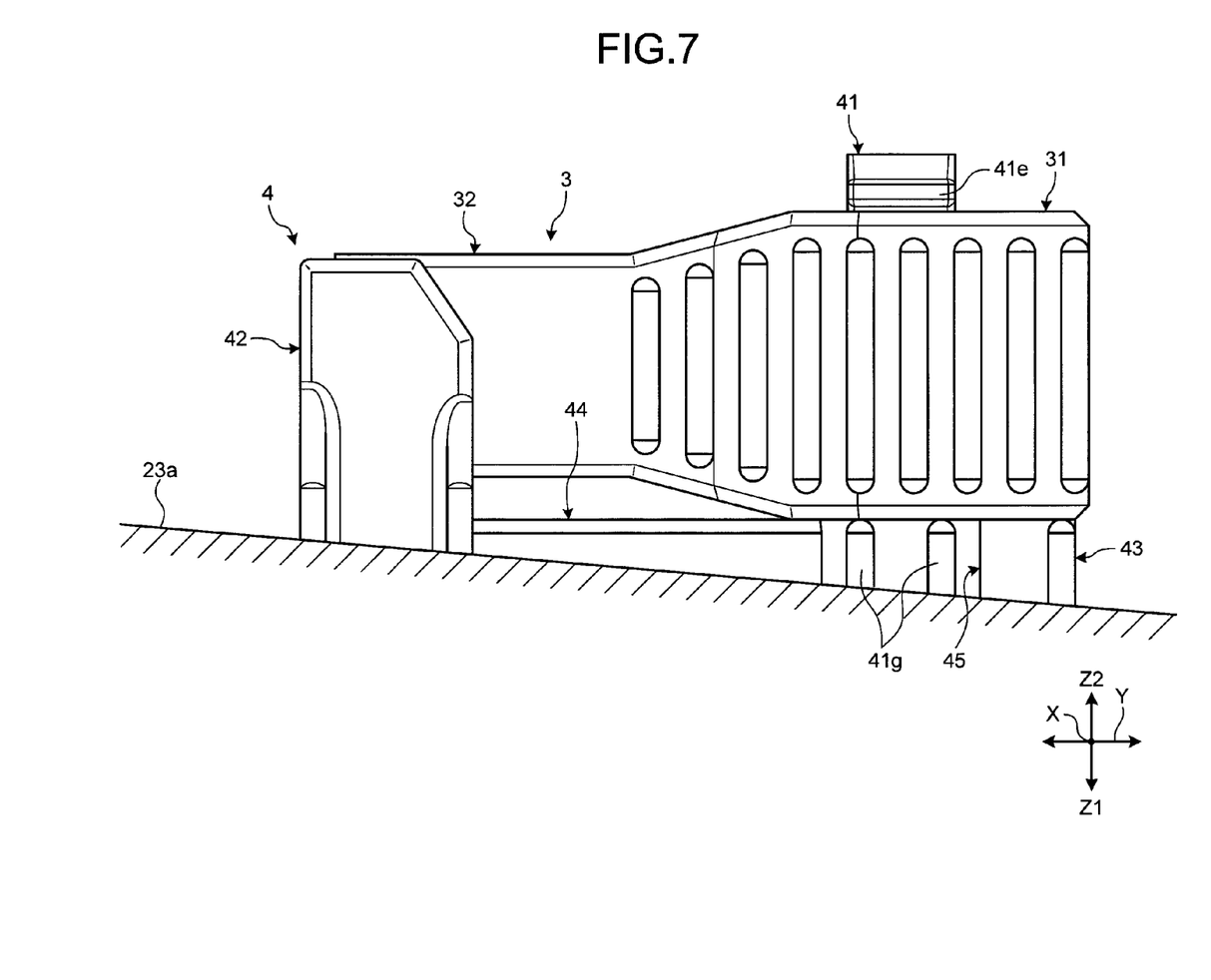
FIG. 7 is a side view illustrating the state in which the tool is held by the tool holding portion according to the embodiment.

First, a description will be given of an electrical connection box according to an embodiment. FIG. 1 is a perspective view illustrating the electrical connection box according to the embodiment. FIG. 2 is a perspective view of an upper cover of the electrical connection box according to the embodiment. FIG. 3 is a perspective view illustrating a tool according to the embodiment. FIG. 4 is a perspective view illustrating a tool holding portion according to the embodiment. FIG. 5 is a plan view illustrating the tool holding portion according to the embodiment. FIG. 6 is a perspective view illustrating a state in which the tool is held by the tool holding portion according to the embodiment. FIG. 7 is a side view illustrating the state in which the tool is held by the tool holding portion according to the embodiment. Herein, an X direction of the respective drawings (also including FIG. 8 and FIG. 9) is a width direction of the electrical connection box in the present embodiment, is a width direction of the tool and the tool holding portion, and is a direction orthogonal to an insertion direction. A Y direction is a longitudinal direction of the electrical connection box in the present embodiment, is a longitudinal direction of the tool and the tool holding portion, is a direction orthogonal to the width direction, and is a direction orthogonal to the insertion direction. A Z direction is an up-down direction of the electrical connection box in the present embodiment, and is a direction orthogonal to the width direction and the longitudinal direction. A Z1 direction is the insertion direction, and a Z2 direction is a pulling direction which is opposite to the insertion direction.

An electrical connection box 1 of the present embodiment is installed in a vehicle such as an automobile to distribute power supplied from a power supply such as a battery to various electronic devices installed in the vehicle through various electronic components. Herein, the electrical connection box 1 is incorporated in a wire harness 100 to integrate and accommodate electronic components such as a connector, a fuse, a relay, a junction, and an electronic control portion included in a connection processing component of, for example, an electric wire 101. For example, the electrical connection box 1 is installed in an engine room and a trunk room of the vehicle, the inside of the vehicle, and the like and is connected between a power supply such as a battery and various electronic devices installed in the vehicle. The electrical connection box 1 is referred to as a junction box, a fuse box, a relay box, or the like in some cases. However, in the present embodiment, the electrical connection box is used as a general term. The electrical connection box 1 is installed in the vehicle (not illustrated) or the like such that the up-down direction is identical to a vertical direction or forms an arbitrary angle with the vertical direction. As illustrated in FIG. 2, the electrical connection box 1 includes a housing 2, a tool 3, and a tool holding portion 4.

As illustrated in FIG. 1, the housing 2 includes a main box body 21, a lower cover 22, and an upper cover 23, and has a three-layer division structure. The housing 2 according to the present embodiment is formed using insulating synthetic resin, and accommodates an electronic component including a fuse 200. Herein, the electric wire 101 is connected to at least a portion of the electronic component. The main box body 21 is formed in a tubular shape, an outer circumferential shape of which is a substantially rectangular shape, when viewed in the insertion direction (Z1), and has an internal space portion (not illustrated). A fuse box (not illustrated) is fixed to the internal space portion in the main box body 21 of the housing 2 according to the present embodiment, or is integrally formed with the main box body 21. The fuse 200 is accommodated in the fuse box, and is detachably held in the fuse box. The lower cover 22 blocks a first opening portion (not illustrated) formed at an end portion of the main box body 21 on a side in the insertion direction. The lower cover 22 is a plate-shaped (tray-shaped) member, and is locked in the main box body 21 by a plurality of locking mechanisms 24. The upper cover 23 blocks a second opening portion (not illustrated) formed at an end portion of the main box body 21 on a side in the pulling direction (Z2). The upper cover 23 is a cover-shaped member, and is locked in the main box body 21 by a locking mechanism 25.

The tool 3 detaches the electronic component accommodated in the housing 2 from the housing 2. The tool 3 in the present embodiment is a fuse puller that detaches the fuse 200 of the electronic component from the fuse box of the housing 2, and is held on a rear surface 23a of the upper cover 23. In other words, the tool 3 is not exposed to the outside of the housing 2, and is held inside the housing 2. The tool 3 is formed using elastically deformable synthetic resin, and includes a main body 31 and a pinching portion 32 as illustrated in FIG. 3.

The main body 31 has a rectangular shape when viewed in the insertion direction, and a holding hole 31a penetrating the main body 31 in an up-down direction is formed. In the main body 31 according to the present embodiment, a notch portion 31b is formed at an end portion on the opposite side from a side at which the pinching portion 32 is formed, that is, on the opposite side from a side at which the pinching portion 32 is formed in the longitudinal direction. The notch portion 31b is formed to communicate with the holding hole 31a.

The pinching portion 32 protrudes from the main body 31, and pinches the electronic component, that is, the fuse 200 in the present embodiment. The pinching portion 32 according to the present embodiment includes two pinching portions 32A and 32B facing each other in the width direction. The pinching portion 32 is formed to protrude in the longitudinal direction from an end portion on the opposite side from the end portion at which the notch portion 31b is formed in the longitudinal direction in the main body 31. A gap S is formed to extend in the longitudinal direction between the pinching portions 32A and 32B. In the pinching portion 32, a hook portion 32a is formed to protrude to the inside of the tool 3 in the width direction at a distal portion, that is, the end portion on the opposite side from the main body 31 side in the longitudinal direction. The hook portion 32a of the pinching portion 32A and the hook portion 32a of the pinching portion 32B are formed to face each other in the width direction. The hook portion 32a in the present embodiment is formed at each of both end portions in the up-down direction in distal portions of the respective pinching portions 32A and 32B. In the pinching portion 32, a stopper portion 32b is formed to protrude to the inside of the tool 3 in the width direction on a main body 31 side from the hook portion 32a in the longitudinal direction. The stopper portion 32b of the pinching portion 32A and the stopper portion 32b of the pinching portion 32B are formed to face each other in the width direction, and the amount of protrusion thereof to the inside of the tool 3 is set such that the hook portions 32a and 32a facing each other in the width direction do not come into contact with each other while the stopper portions 32b and 32b facing each other in the width direction come into contact with each other due to elastic deformation of the pinching portions 32A and 32B. The pinching portion 32 pinches the fuse 200 when a head portion (not illustrated) of the fuse 200 is inserted into a fuse pinching space portion S1 including a space portion formed between the hook portion 32a and the stopper portion 32b of the pinching portion 32A, a space portion formed between the hook portion 32a and the stopper portion 32b of the pinching portion 32B, and a gap S that faces and communicates with the space portions in the width direction.

The tool holding portion 4 is formed on a forming face of the housing 2 to detachably hold the tool 3. As illustrated in FIG. 4 and FIG. 5, the tool holding portion 4 in the present embodiment is formed on the rear surface 23a of the upper cover 23 corresponding to a forming face. The tool holding portion 4 is formed using insulating synthetic resin, and is integrally formed with the upper cover 23. The tool holding portion 4 includes a holding main body 41, a rotation regulating portion 42, a protrusion 43, a first connection portion 44, and a second connection portion 45.

The holding main body 41 is formed to protrude from the rear surface 23a corresponding to the forming face. The holding main body 41 in the present embodiment is formed to protrude in the pulling direction in a recession 23b formed on the rear surface 23a. The holding main body 41 is inserted into the holding hole 31a of the tool 3, and holds the main body 31 of the tool 3 while being inserted into the holding hole 31a. The holding main body 41 is formed in a cylindrical shape at least on a side in the pulling direction, and has an outer diameter set to a diameter that allows the holding main body 41 to be inserted into the holding hole 31a. In the holding main body 41, notch portions 41c and 41d communicating with a hollow portion 41b are formed at a distal portion, that is, an end portion in the pulling direction. The notch portions 41c and 41d face each other in a radial direction of the holding main body 41, and are formed to extend in the insertion direction. In the holding main body 41, holding hooks 41e and 41f are formed in portions between the notch portion 41c and the notch portion 41d at the distal portion. The holding hooks 41e and 41f are formed to protrude outward in the radial direction of the holding main body 41, and a maximum length of the holding main body 41 in the radial direction is set to be larger than a diameter of the holding hole 31a in a state that an external force is not applied to the holding main body 41. Herein, the holding hooks 41e and 41f in the present embodiment are set to come into contact with the main body 31 while tool stopper portions 41g and 42c come into contact with the tool 3 in a holding state described below. In the holding main body 41, at least one tool stopper portion 41g is formed at an end portion in the insertion direction. The tool stopper portions 41g is formed to protrude in the pulling direction from the rear surface 23a, and comes into contact with the main body 31 of the tool 3 to support the tool 3 from a side in the insertion direction in the holding state described below. In the present embodiment, a plurality of tool stopper portions 41g is formed to face each other in the width direction and a plurality of tool stopper portions 41g (for example, two tool stopper portions 41g as illustrated in FIG. 5) is formed in the longitudinal direction.

The rotation regulating portion 42 is formed to protrude from the rear surface 23a corresponding to the forming face. The rotation regulating portion 42 in the present embodiment is formed in a recession 23c formed on the rear surface 23a, which is different from the recession 23b and is formed to be spaced apart from the recession 23b in the longitudinal direction. In other words, the rotation regulating portion 42 is formed to be spaced apart from the holding main body 41 in the longitudinal direction and is formed to protrude in the pulling direction on the rear surface 23a. The rotation regulating portion 42 regulates rotation of the pinching portion 32 in the holding state in which the tool 3 is held by the tool holding portion 4. In other words, the rotation regulating portion 42 regulates rotation of the pinching portion 32 about a central axis of the holding hole 31a in an inserted state in which the holding main body 41 is inserted into the holding hole 31a. The rotation regulating portion 42 is formed in a U-shape having an opening portion 42a on a side of the holding main body 41 in the longitudinal direction when viewed in the insertion direction. In other words, the rotation regulating portion 42 is formed such that a hollow portion 42b communicates with the opening portion 42a. The opening portion 42a and the hollow portion 42b are formed to have sizes that allow the distal portion of the pinching portion 32 to be inserted into the portions in the inserted state. In the rotation regulating portion 42, at least one tool stopper portion 42c is formed at an end portion in the insertion direction. The tool stopper portion 42c is formed to protrude in the pulling direction from the rear surface 23a. In the holding state, the tool stopper portion 42c comes into contact with the pinching portion 32 of the tool 3 to support the tool 3 from a side in the insertion direction. In the present embodiment, when viewed in the insertion direction, a plurality of tool stopper portions 42c is formed to face each other in the width direction in the hollow portion 42b and a plurality of tool stopper portions 42c (for example, two tool stopper portions 42c as illustrated in FIG. 5) is formed in the longitudinal direction.

The protrusion 43 is formed to protrude from the rear surface 23a corresponding to the forming face on the opposite side from the rotation regulating portion 42 side with respect to the holding main body 41 in the longitudinal direction. In the holding state, the protrusion 43 is formed to face the main body 31 in the insertion direction on the opposite side from the pinching portion 32 side with respect to the holding hole 31a in the longitudinal direction. The protrusion 43 in the present embodiment is formed to be separated from the holding main body 41 in the longitudinal direction, and is formed in a flat plate shape by extending in the width direction. The protrusion 43 is formed to come into contact with the main body 31 in the holding state. In other words, the protrusion 43 comes into contact with the main body 31 while the tool stopper portions 41g and 42c come into contact with the tool 3 in the holding state.

The first connection portion 44 connects the holding main body 41 to the rotation regulating portion 42. The first connection portion 44 is formed to protrude from the rear surface 23a corresponding to the forming face. The first connection portion 44 in the present embodiment has a flat plate shape extending in the longitudinal direction, and has one end portion in the longitudinal direction connected to the holding main body 41 and the other end portion connected to the rotation regulating portion 42 in the hollow portion 42b. As illustrated in FIG. 6 and FIG. 7, in the holding state, the first connection portion 44 is positioned on the insertion direction side of the tool 3. The amount at which the first connection portion 44 protrudes from the rear surface 23a in the pulling direction is set such that the first connection portion 44 does not come into contact with the tool 3. The first connection portion 44 may be integrated with the holding main body 41 and the rotation regulating portion 42.

As illustrated in FIG. 4 and FIG. 5, the second connection portion 45 connects the holding main body 41 to the protrusion 43. The second connection portion 45 is formed to protrude from the rear surface 23a corresponding to the forming face. The second connection portion 45 in the present embodiment has a flat plate shape extending in the longitudinal direction, and has one end portion in the longitudinal direction connected to the protrusion 43 and the other end portion connected to the holding main body 41. As illustrated in FIG. 6 and FIG. 7, the second connection portion 45 is positioned in the holding hole 31a and the notch portion 31b of the main body 31 in the holding state. A length (thickness) of the second connection portion 45 in the width direction is set to be narrower than a length of the notch portion 31b in the width direction such that the second connection portion 45 does not come into contact with the tool 3. The second connection portion 45 may be integrated with the holding main body 41 and the protrusion 43.

Next, a description will be given of attaching of the tool 3 to the tool holding portion 4. While the upper cover 23 is detached from the main box body 21, the upper cover 23 is disposed with respect to a user such that the rear surface 23a faces an eye line of the user. Subsequently, as illustrated in FIG. 6 and FIG. 7, the user pinches the tool 3 with fingers to move the tool 3 in the insertion direction with respect to the tool holding portion 4, thereby inserting the tool holding portion 4 into the tool 3. Specifically, the user inserts the holding main body 41 to the holding hole 31a of the tool 3, and inserts the pinching portion 32 into the hollow portion 42b of the rotation regulating portion 42. In this instance, the holding hooks 41e and 41f are elastically deformed to the inside of the tool 3 in the width direction by coming into contact with the main body 31 (an inner wall forming the holding hole 31a). Then, the user inserts the tool holding portion 4 into the tool 3 until the holding hooks 41e and 41f extrude to a side in the pulling direction from the holding hole 31a, the insertion direction side of the main body 31 comes into contact with the tool stopper portion 41g, and a the insertion direction side of the pinching portion 32 comes into contact with the tool stopper portion 42c. In this instance, the elastically deformed holding hooks 41e and 41f are elastically restored to the outside of the tool 3 in the width direction. In this way, the tool 3 is held by the tool holding portion 4, and the holding state in which the tool 3 is held by the tool holding portion 4 is obtained. In the holding state, the insertion direction side of the tool 3 comes into contact with the tool stopper portions 41g and 42c, and the pulling direction side of the tool 3 comes into contact with the holding hooks 41e and 41f. Therefore, the tool 3 is held in a state in which movement in the insertion direction and the pulling direction is regulated between the tool stopper portions 41g and 42c and the holding hooks 41e and 41f. In addition, in the holding state, rotation of the tool 3 is regulated when the pinching portion 32 is inserted into the hollow portion 42b of the rotation regulating portion 42. In this way, the tool 3 is reliably held by the tool holding portion 4, and may be inhibited from moving with respect to the tool holding portion 4 or being removed from the tool holding portion 4 due to a disturbance such as vibration delivered to the electrical connection box 1 from the vehicle in which the electrical connection box 1 is installed.

Figure 8:
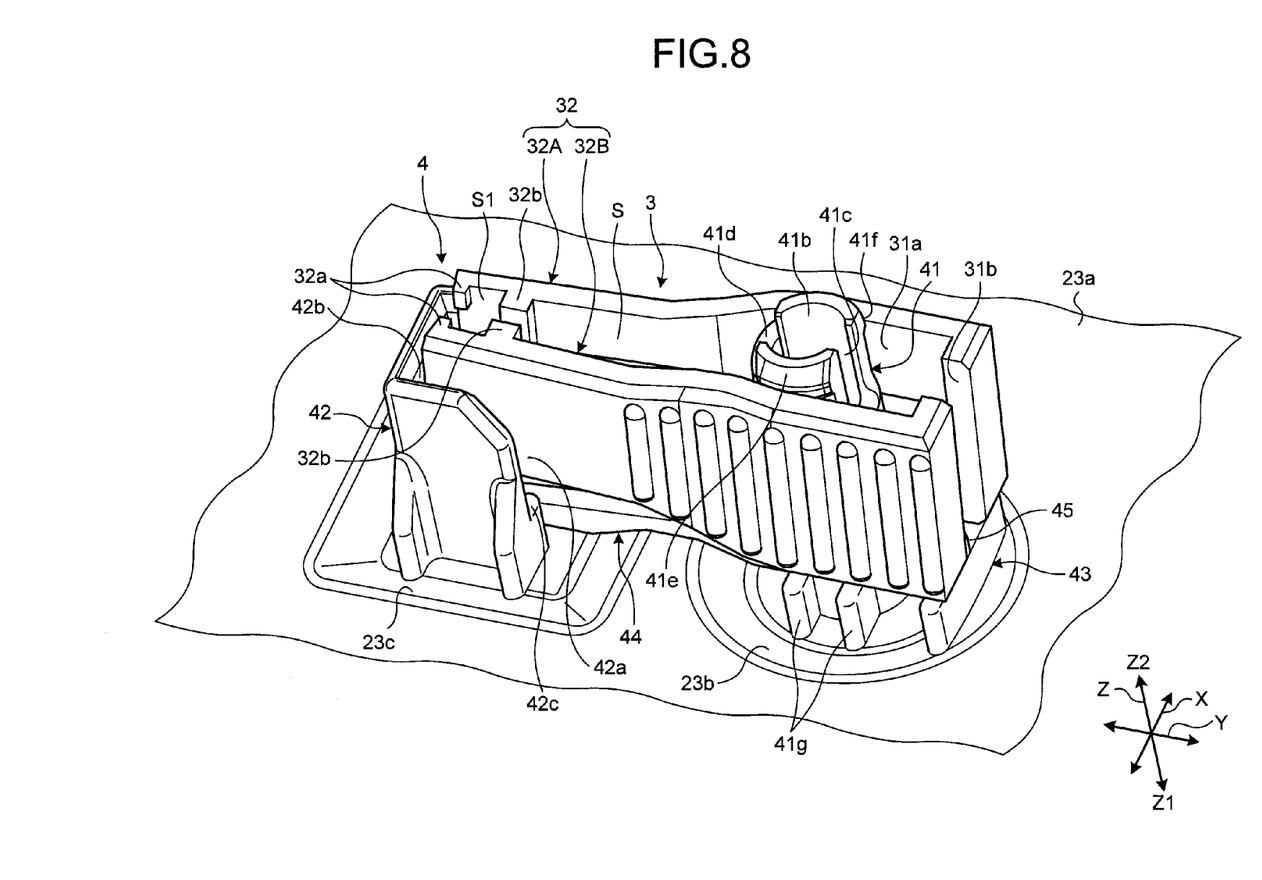
FIG. 8 is a perspective view for description of an operation of detaching the tool in the holding state according to the embodiment.
Figure 9:
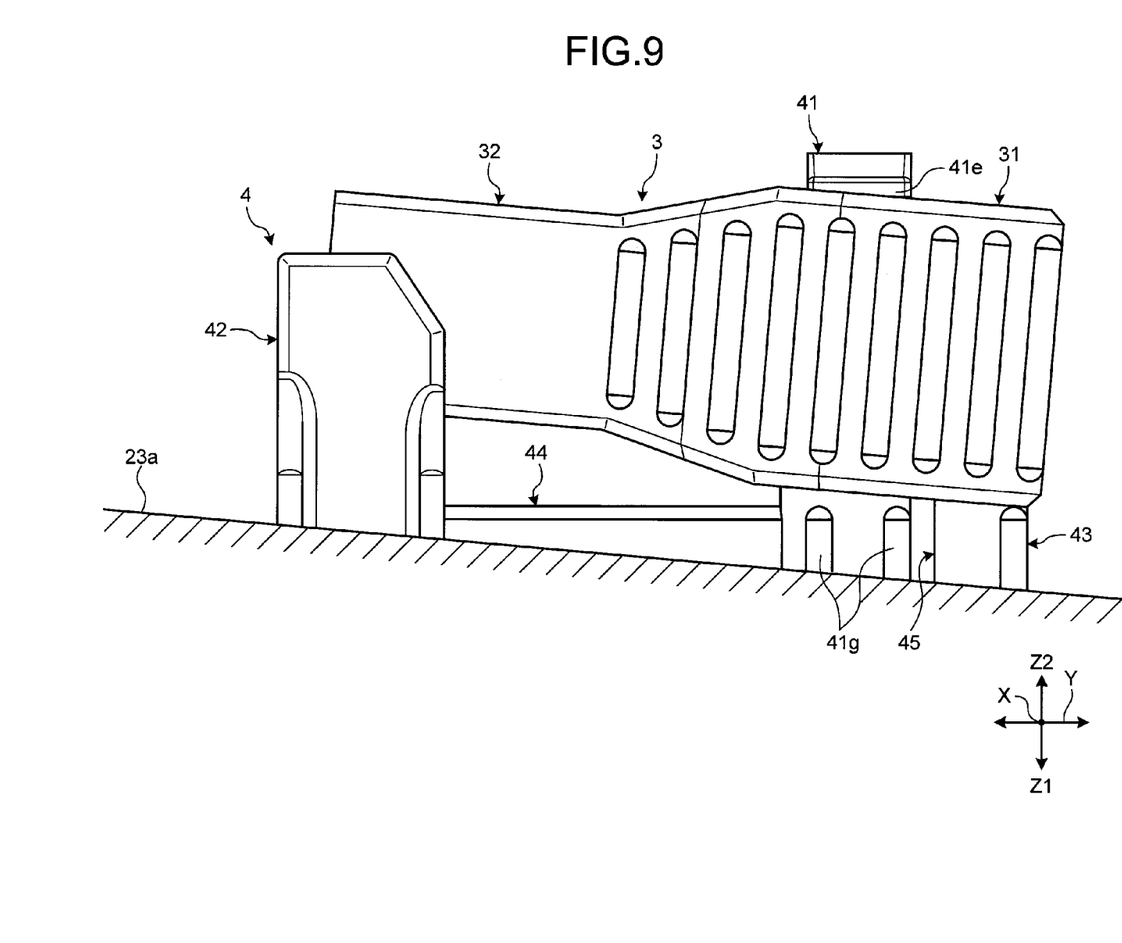
FIG. 9 is a side view for description of the operation of detaching the tool in the holding state according to the embodiment.

Next, a description will be given of detaching of the tool 3 from the tool holding portion 4. FIG. 8 is a perspective view for description of an operation of detaching the tool in the holding state according to the embodiment. FIG. 9 is a side view for description of the operation of detaching the tool in the holding state according to the embodiment. While the upper cover 23 is detached from the main box body 21, the upper cover 23 is disposed with respect to the user such that the rear surface 23a faces the eye line of the user. Subsequently, the user pinches the tool 3 with the fingers to move the tool 3 in the holding state illustrated in FIG. 6 and FIG. 7 in the pulling direction with respect to the tool holding portion 4, thereby detaching the tool 3 from the tool holding portion 4. Specifically, the user pulls out the holding main body 41 from the holding hole 31a of the tool 3, and pulls out the pinching portion 32 from the hollow portion 42b of the rotation regulating portion 42. In this instance, the holding hooks 41e and 41f are elastically deformed to the inside of the tool 3 in the width direction by coming into contact with the main body 31 (the inner wall forming the holding hole 31a).

Herein, referring to the tool 3, when the tool 3 is detached from the tool holding portion 4, as illustrated in FIG. 8 and FIG. 9, the tool 3 may be in an inclined state from the holding state in which the inclined state the pinching portion 32 is positioned in the pulling direction compared to a position of the holding main body 41, since it is more difficult to pull out the main body 31 from the holding main body 41 than to pull out the pinching portion 32 from the rotation regulating portion 42 due to resistance occurring when the holding hooks 41e and 41f come into contact with the main body 31 at the time of pulling out the holding main body 41 from the holding hole 31a. In the inclined state of the tool 3, an external force on the opposite side from the rotation regulating portion 42 side acts on the holding main body 41 in the longitudinal direction from the tool 3, and the holding main body 41 starts to fall to the opposite side from the rotation regulating portion 42 side in the longitudinal direction. In addition, in the inclined state of the tool 3, the tool stopper portion 41g is separated from the main body 31, and the tool stopper portion 42c is separated from the pinching portion 32. However, similarly to the case of the holding state, a contact state of the protrusion 43 and the main body 31 is maintained. In addition, when the tool 3 is moved in the pulling direction with respect to the tool holding portion 4, the pinching portion 32 of the tool 3 rotates in the pulling direction about a contact point of the main body 31 and the protrusion 43. Further, while the holding main body 41 is inhibited from starting to fall to the opposite side from the rotation regulating portion 42 side in the longitudinal direction, the holding main body 41 is pull out from the holding hole 31a, and the tool 3 is detached from the tool holding portion 4. In this instance, the elastically deformed holding hooks 41e and 41f are elastically restored since the external force does not act.

As described in the foregoing, in the electrical connection box 1 according to the present embodiment, the protrusion 43 is formed to face the opposite side from the pinching portion 32 side with respect to the holding hole 31a in the main body 31 in the insertion direction in the holding state. Further, since the protrusion 43 comes into contact with the main body 31 when the pinching portion 32 is positioned in the pulling direction corresponding to the opposite direction of the insertion direction compared to a position of the main body 31 from the holding state, the holding main body 41 is inhibited from falling to the opposite side from the rotation regulating portion 42 side in the longitudinal direction in the inclined state in which the tool 3 is inclined with respect to the tool holding portion 4. Therefore, when compared to a case in which the protrusion 43 is not present, the holding main body 41 may be inhibited from falling, that is, being inclined to the opposite side from the rotation regulating portion 42 side in the longitudinal direction. In this way, the holding main body 41 is inhibited from being deformed following a pulling operation of the tool 3. Thus, in association with the pulling operation, the holding hooks 41e and 41f easily enter the holding hole 31a, the holding main body 41 is easily detached from the holding hole 31a, and the tool 3 in the holding state may be reliably detached from the housing 2.

In addition, in the electrical connection box 1 according to the present embodiment, the holding main body 41 is connected to the rotation regulating portion 42 through the first connection portion 44, and thus the holding main body 41 and the rotation regulating portion 42 are integrated with each other through the first connection portion 44, and strength thereof is improved. Therefore, the holding main body 41 and the rotation regulating portion 42 may be inhibited from tilting in the longitudinal direction. In this way, the holding main body 41 may be further inhibited from tilting to the opposite side from the rotation regulating portion 42 side in the longitudinal direction, and thus the tool 3 in the holding state may be more reliably detached from the housing 2.

In addition, in the electrical connection box 1 according to the present embodiment, the holding main body 41 is connected to the protrusion 43 through the second connection portion 45, and thus the holding main body 41 and the protrusion 43 are integrated with each other through the second connection portion 45, and strength thereof is improved. Therefore, the holding main body 41 and the protrusion 43 may be inhibited from tilting in the longitudinal direction. In this way, the holding main body 41 may be inhibited from tilting to the opposite side from the rotation regulating portion 42 side in the longitudinal direction. Further, in the pulling operation, even when an external force in the longitudinal direction acts on the protrusion 43 coming into contact with the main body 31 through the tool 3, the protrusion 43 may be inhibited from being deformed in the longitudinal direction. In this way, the tool 3 in the holding state may be more reliably detached from the housing 2.

In addition, in the electrical connection box 1 according to the present embodiment, the protrusion 43 comes into contact with the main body 31 in the holding state. Thus, when the tool 3 is changed from the holding state to the inclined state, the protrusion 43 comes into contact with the main body 31 at all times. Therefore, when the tool 3 is changed from the holding state to the inclined state, the holding main body 41 does not tilt to the opposite side from the rotation regulating portion 42 side in the longitudinal direction before the protrusion 43 comes into contact with the main body 31. Thus, the tool 3 in the holding state may be more reliably detached from the housing 2.

In the present embodiment, the protrusion 43 is formed in the flat plate shape. However, the invention is not restricted thereto. For example, a side surface of the protrusion 43 in the longitudinal direction may have a shape such as a shape of a triangle or a trapezoid widening toward the rear surface 23a when viewed in the width direction. In this case, since rigidity of the protrusion 43 can be improved, the protrusion 43 may be inhibited from being deformed in the longitudinal direction even when an external force in the longitudinal direction acts on the protrusion 43 coming into contact with the main body 31 through the tool 3 in the pulling operation. In this way, the tool 3 in the holding state may be reliably detached from the housing 2.

In the electrical connection box according to the embodiment, the protrusion comes into contact with the main body in the state in which the pinching portion is positioned in the pulling direction corresponding to the opposite direction of the insertion direction compared to a position of the main body, and thus the holding main body may be inhibited from tilting to the opposite side from the rotation regulating portion side in the longitudinal direction, and there is an effect that the tool in the holding state may be reliably detached from the housing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical connection box comprising:
    a housing that accommodates an electronic component;
    a tool that detaches the electronic component from the housing; and
    a tool holding portion that is formed on a forming face of the housing and detachably holds the tool, wherein
    the tool includes
    a main body in which a holding hole is formed, and
    a pinching portion that protrudes from the main body and pinches the electronic component,
    the tool holding portion includes
    a holding main body that is formed to protrude from the forming face and holds the main body by being inserted into the holding hole,
    a rotation regulating portion that protrudes from the forming face and is formed to be separated from the holding main body, and regulates rotation of the pinching portion in a holding state in which the tool is held by the tool holding portion,
    a first connection portion that protrudes from the forming face and extends from and is connected to each of the holding main body and the rotation regulating portion, and
    a protrusion that is formed to protrude from the forming face on an opposite side from a side of the rotation regulating portion with the holding main body interposed therebetween, and
    the protrusion is formed to face an opposite side from a side of the pinching portion with the holding hole interposed therebetween in the main body in an insertion direction in the holding state, and
    the protrusion comes into contact with the main body in a state in which the pinching portion is positioned in a pulling direction corresponding to an opposite direction of the insertion direction compared to a position of the main body from the holding state.

2. The electrical connection box according to claim 1, further comprising:
    a second connection portion that is formed to protrude from the forming face to connect the holding main body to the protrusion.

3. The electrical connection box according to claim 1, wherein
    the protrusion comes into contact with the main body in the holding state.

4. The electrical connection box according to claim 2, wherein
    the protrusion comes into contact with the main body in the holding state.

5. The electrical connection box according to claim 1, wherein
    the tool is spaced away from the first connection portion.

6. The electrical connection box according to claim 1, wherein
    the forming face includes a first recession, and
    the holding main body protrudes from the first recession.

7. The electrical connection box according to claim 6, wherein
    the forming face includes a second recession that is different from and spaced away from the first recession, and
    the rotation regulating portion protrudes from the second recession.

8. The electrical connection box according to claim 7, wherein
the first connection portion extends along each of the first recession and the second recession.

9. The electrical connection box according to claim 2, wherein
the holding main body portion includes a notch portion, and
the second connection portion extends along the holding main body portion from the forming face to a position on the holding main body portion that is between the forming face and the notch portion.

10. The electrical connection box according to claim 2, wherein
the second connection portion is connected to and extends from each of the protrusion and the holding main body.

* * * * *